E. SOVA.
MEANS FOR PREVENTING VESSELS FROM SINKING.
APPLICATION FILED APR. 29, 1918.

1,283,345.

Patented Oct. 29, 1918.

INVENTOR
Emil Sova
BY
A. M. Booster
ATTORNEY

UNITED STATES PATENT OFFICE.

EMIL SOVA, OF BRIDGEPORT, CONNECTICUT.

MEANS FOR PREVENTING VESSELS FROM SINKING.

1,283,345.  Specification of Letters Patent.  Patented Oct. 29, 1918.

Application filed April 29, 1918. Serial No. 231,404.

*To all whom it may concern:*

Be it known that I, EMIL SOVA, a citizen of the United States, residing at Bridgeport, county of Fairfield, State of Connecticut, have invented an Improvement in Means for Preventing Vessels from Sinking, of which the following is a specification.

This invention has for its object to provide means for preventing vessels from sinking, that may be easily and quickly attached to vessels already in commission and at a relatively small expense, the operative portion of which will collapse out of the way when not in use, and may be quickly placed in operative position when required, and which shall require no changes in the structure of the vessel but simply the provision of air connections for use when required.

In the accompanying drawing forming a part of this specification—Figure 1 is an outline drawing illustrating the application to a vessel of my novel means for preventing sinking in the event of the hull being ruptured by the explosion of a torpedo, or a collision, or any of the accidents to which a vessel is exposed when in use;

Figure 1:
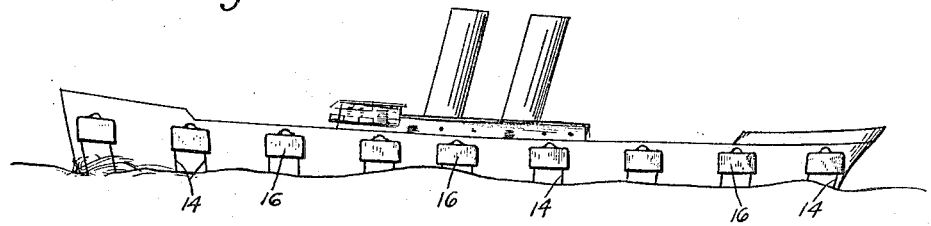
Figure 2:
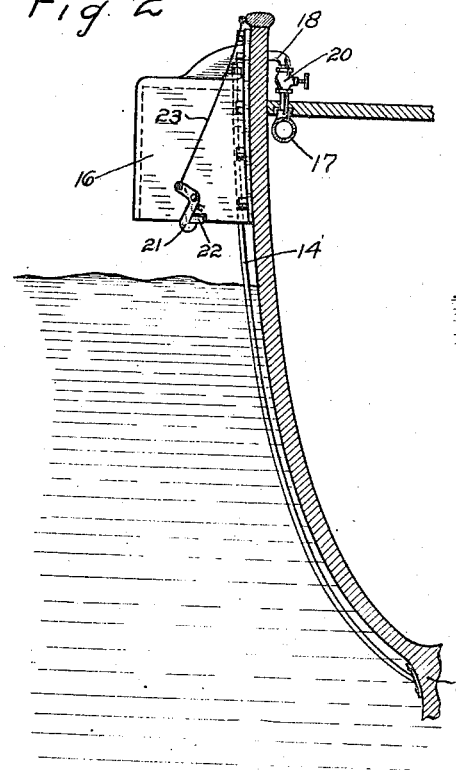
Fig. 2, is a sectional view on an enlarged scale, showing in elevation one of the housings into which an air bag collapses when deflated.
Figure 3:
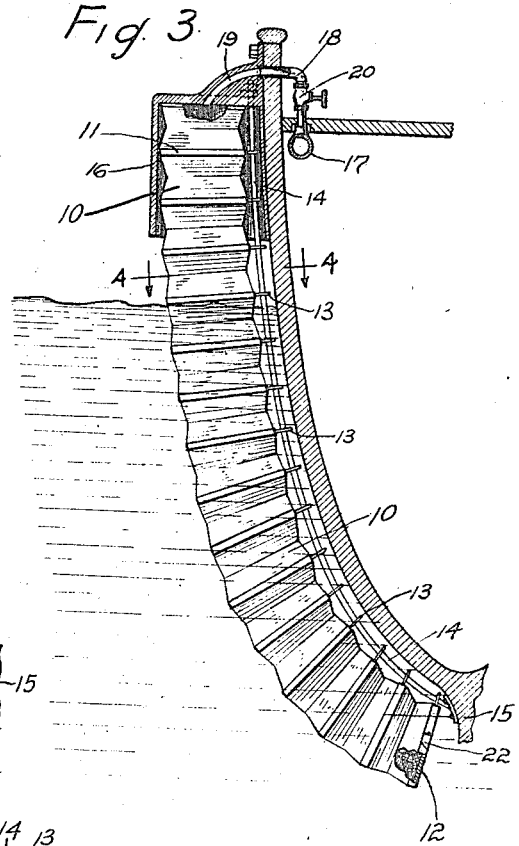
Fig. 3, is a view partly in elevation and partly in section showing an air bag inflated, as in use.
Figure 4:
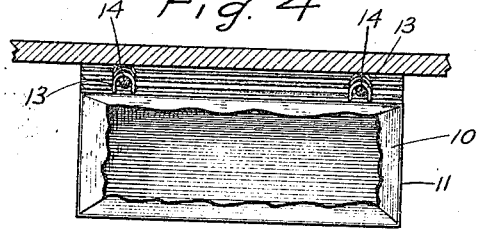
Fig. 4 is a section on a still larger scale on the line 4—4 in Fig. 3, looking in the direction of the arrows.

The invention consists in the provision of collapsible air bags, housings into which they collapse when deflated, means for inflating the bags, and guiding means by which the bags when inflated are caused to distend downward, as far as may be thought desirable, in proximity to the hull of the vessel.

10 denotes an air bag which is preferably made rectangular like the bellows of an accordion. This bag is made of strong flexible air tight rubber cloth and is provided at regular intervals with rings 11, to which the material of the bag is firmly secured. At the lower end of the bag is a head 12 of metal, wood or other suitable material which strengthens the bag and may be made to serve as a closure for the housing, presently to be described. Each of the rings and the head are provided with eyes 13, two in the present instance, which are adapted to slide on guide rods 14. These guide rods are made heavy enough to retain their rigidity under the ordinary conditions of use and are curved to correspond with the curvature of the hull of the vessel, one end of each rod being rigidly secured to the upper wall of the housing and the other to the exterior of the hull well under water. In the present instance I have shown the lower end of the rod as extending down to the keel, indicated by 15, and rigidly secured thereto. Each bag is provided with a housing 16 into which it will collapse when the air is exhausted. These housings are secured to the hull well above the water line and are practically closed by the heads 12 when the bags are collapsed by exhaustion of air. 17 denotes an air supply pipe on the inner side of the vessel, a pipe being provided on each side to supply all of the bags on that side. A branch pipe 18 leads from pipe 17 to each housing, in which there is a duct 19 opening into the bag. Each branch pipe is provided with a valve 20, by which the air supply to the corresponding bag is controlled. Any number of air bags though advisable may be applied to each side of the vessel, that being a matter that will depend upon the size and character of the vessel and the use to which it is to be placed. The bags may be spaced apart as indicated in the drawing or may be placed close together if preferred. In sailing the high seas and when not in a submarine zone, the bags would normally remain deflated in the housings, in which position they are retained in any suitable manner, as by gravity catches 21, which are adapted to engage lugs 22 upon the heads of the bags when the latter collapse into the housings. These catches are shown as self locking, being swung out of locking position when engaged by the lugs and dropping into the locking position when the lugs have passed them, and thus retaining the deflated bags collapsed and wholly within the housings. The catches may be operated to release the bags by means of a cord or wire 23. If preferred the catches may be retained out of locking position and thereby avoid one operation when quick inflation of the bags is required. Likewise the valves may all be left open, thus avoiding individual operations at the bags and permitting the inflation of all the bags simultaneously when air under compression is admitted to pipes 17. When in a danger zone it is required that a supply of air be kept at all times under compression so that it may be admitted to pipe 17 and to the bags without an instant's delay. The instant air is admitted to the bags they will be distended thereby and will follow the guide rods down the side of the hull clear to the lower ends of the rods. When it is not required that the bags be distended, the air is exhausted therefrom and the bags will collapse like the bellows of an accordion and follow the guide rods up into the housing where they may be locked if desired, as already explained.

Having thus described my invention, I claim:

The combination with the hull of a vessel, of a housing secured exteriorly thereto above the water line, guide rods having their respective ends secured within the housing and to the exterior of the hull below the water line, a bellows-like bag capable of being collapsed within the housing and having eyes adapted to travel on the guide rods, the open end of the bag being hermetically connected with the housing, the other end of the bag being closed by an end wall capable of serving as a wall of the housing, an air connection communicating with the interior of the bag through a wall of the housing, and means for locking the closed end wall of the bag to the housing to close the latter.

In testimony whereof I affix my signature.

EMIL SOVA.

Copies of this patent may be obtained for five cents each, by addressing the "Commissioner of Patents, Washington, D. C."